(12) United States Patent
Hatori et al.

(10) Patent No.: US 7,307,647 B2
(45) Date of Patent: Dec. 11, 2007

(54) COMPUTER SYSTEM, DISPLAY CONTROL APPARATUS, DISPLAY APPARATUS, DISPLAY CONTROL METHOD, RECORDING MEDIUM, AND PROGRAM TRANSMISSION APPARATUS

(75) Inventors: Masahiko Hatori, Ebina (JP); Takenobu Nakao, Tokyo-to (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 103 days.

(21) Appl. No.: 09/872,656

(22) Filed: Jun. 1, 2001

(65) Prior Publication Data

US 2002/0075289 A1   Jun. 20, 2002

(30) Foreign Application Priority Data

Jul. 6, 2000   (JP) .............................. 2000-205725

(51) Int. Cl.
*G09G 5/02* (2006.01)

(52) U.S. Cl. .................... 345/698; 345/472.2; 345/671

(58) Field of Classification Search ................ 345/441, 345/339, 661, 670–671, 698, 619, 472.1, 345/472.2
See application file for complete search history.

(56) References Cited

U.S. PATENT DOCUMENTS

| 5,612,715 | A | * | 3/1997 | Karaki et al. ................ 345/698 |
| 5,721,565 | A | * | 2/1998 | Nguyen ....................... 345/660 |
| 5,729,255 | A | * | 3/1998 | Aoki ........................... 715/723 |
| 5,767,464 | A | * | 6/1998 | Dyer et al. .................. 202/5 A |
| 5,833,050 | A | * | 11/1998 | Takagi et al. ................ 200/334 |
| 5,910,801 | A | * | 6/1999 | Rosenburg et al. ......... 345/339 |
| 6,084,598 | A | * | 7/2000 | Chekerlla .................... 345/441 |
| 6,146,275 | A | * | 11/2000 | Asai et al. .................... 463/31 |
| 6,181,318 | B1 | * | 1/2001 | Lim ........................... 345/698 |
| 6,313,822 | B1 | * | 11/2001 | McKay et al. ............... 345/698 |
| 6,344,865 | B1 | * | 2/2002 | Matthews et al. .......... 345/698 |
| 6,396,507 | B1 | * | 5/2002 | Kaizuka et al. ............. 345/661 |
| 6,515,678 | B1 | * | 2/2003 | Boger ......................... 345/660 |
| 6,580,434 | B1 | * | 6/2003 | Curtis ......................... 345/596 |

FOREIGN PATENT DOCUMENTS

| JP | 05-181443 | 7/1993 |
| JP | 07-199855 | 8/1995 |
| JP | 11-007273 | 1/1999 |
| JP | 11-102278 | 4/1999 |
| JP | 2000-112447 | 4/2000 |

\* cited by examiner

*Primary Examiner*—Richard Hjerpe
*Assistant Examiner*—Kimnhung Nguyen
(74) *Attorney, Agent, or Firm*—Sawyer Law Group LLP

(57) ABSTRACT

To allow for switching between a normal display and a zoom display by a simple operation, thereby providing both of a large amount of information by high resolution and high visibility of the display. In a computer system having a display apparatus as output unit, an input section 50 for accepting a user operation to issue a request for changing a display zoom factor, a resolution changer 10 for changing the resolution of the display apparatus in response to the request for changing the display zoom factor issued by the input section 50, and a window resizer 20 for resizing a predetermined window displayed on the display screen 70 of the display apparatus so as to be displayed over almost the entire display screen 70 after the resolution is change by the resolution changer 10.

9 Claims, 5 Drawing Sheets

COMPUTER SYSTEM, DISPLAY CONTROL APPARATUS, DISPLAY APPARATUS, DISPLAY CONTROL METHOD, RECORDING MEDIUM, AND PROGRAM TRANSMISSION APPARATUS

FIELD OF THE INVENTION

The present invention relates to a display control technology for changing a display zoom factor on the display screen of a display apparatus as needed.

BACKGROUND OF THE INVENTION

The resolution of a display, the main output unit in a computer system, is becoming higher year by year, thereby allowing an image to be displayed in greater detail. This is because the performance of a graphics accelerator that is installed in the computer system and the performance of the display is improved.

On the other hand, the size of the display screen of a display apparatus for displaying images cannot unlimitedly be increased because of physical limitations of the display apparatus itself. A flat panel display included in a notebook computer, for example, cannot be much larger than the main unit of the computer because of its notebook shape and therefore the size of its display screen is limited as a necessity. Also a display, especially a CRT display, in a desktop computer, cannot be made unlimitedly larger in terms of its footprint and weight because the display apparatus is placed on a desk.

Conventionally, therefore, dots, which are minimum display units, are made smaller to achieve higher resolution for a display screen of limited size.

While the amount of information displayed on the display screen can be increased by reducing a dot size to provide a higher resolution, the size of an image and character is also reduced by the reduced dot size, thereby degrading the visibility of the content of the display.

A unit for zooming in on a portion of a display screen is provided in most of today's computer systems in order to improve visibility of the display content to visually impaired users. This unit can be used to improve visibility of an image and character the size of which is, as mentioned above, reduced by increased resolution.

Windows 98 and Windows NT, which are operating systems from Microsoft Inc., include a tool called "magnifier" as standard. This tool opens a special window used for displaying an enlarged image, and enlarges and displays a portion in the vicinity of the mouse cursor or key cursor in this special window in real time.

FIG. 1 shows a conventional display image zoomed in by the magnifier on a display screen. In FIG. 1, an area labeled with 401 is the area where an image zoomed in by the magnifier is displayed.

A notebook personal computer from IBM contains, in addition to the above-mentioned tool supported by the OS, its own tool for enlarging an image in a rectangular area in the vicinity of the mouse cursor.

FIG. 2 shows a conventional display image zoomed in by this magnification tool on a display screen. In FIG. 2, an area labeled with 501 is the area where an image zoomed in by the magnifier tool is displayed.

Problems to be Solved by the Invention

Conventionally, when a higher resolution is provided by reducing dot size, the size of an image and a character is also reduced with the reduced dot size, thus degrading the visibility of the content of the display, as described earlier. To solve the problem, a unit for zooming in on a portion of a display screen, which is conventionally provided in a computer system, may be used. However, such a technology cannot provide an environment having adequately high visibility to the user.

That is, such types of technology zoom in only on a predetermined area on a display screen. Therefore when a large window or area in which an enlarged image is displayed is provided on the screen, the other areas on the screen are hidden by the window or area to degrade the visibility of the display.

Furthermore, because all of these technologies use software to zoom the image, significant CPU overhead is introduced, thus limiting the size of the area that can be zoomed, and reducing the display speed when a large area is zoomed in.

It is an object of the present invention to allow for switching between a normal display and a zoom display by a simple operation, thereby providing both of a large amount of information achieved by high resolution and high visibility of the display.

It is another object of the present invention to zoom in on a display screen by using hardware unit without placing stress on a user.

BRIEF SUMMARY OF THE INVENTION

In order to achieve these objects, the present invention provides a computer system having input unit for accepting a user operation to generate a predetermined event, a central processing unit, and a display apparatus, comprising: resolution changing unit for changing the resolution of the display apparatus in response to the input event generated by the input unit; and window resizing unit for, in response to the event generated by the input unit, resizing a predetermined window displayed on the display apparatus so as to be displayed over almost the entire display screen after the resolution is changed by the resolution changing unit.

The concept of "computer system" used herein includes a common personal computer comprising input unit such as a keyboard and mouse, arithmetic/logic unit having a central processing unit (CPU) and memory, and a display apparatus as output unit. Examples of the computer herein include a notebook personal computer, and a desktop personal computer system connected to a display apparatus and a keyboard through a cable.

If Windows 98 or Windows NT is used as the operating system (OS) of the computer, a window maximizing capability provided by the OS may be used as the unit for displaying a window over almost the entire display screen.

In a system using a multiwindow-based display system, the window resizing unit may be characterized by resizing a window which was active before the resolution was changed by the resolution changing unit.

In such a case, inactive windows may similarly be extended, behind the active window, over the entire display screen, or may be kept unchanged irrespective of the resolution change.

The computer system described earlier may be characterized by, in addition to the above-describe configuration, further comprising a display status restoring unit for holding a display status before the resolution is changed by the resolution changing unit and, when the resolution of the display apparatus is restored to the resolution before being changed, restoring the resolution of the display apparatus to the held display status.

Furthermore, the present invention can provide a computer system characterized by the following configuration: it comprises an input unit for accepting a predetermined input and display zoom factor changing unit for changing a display zoom factor by changing the resolution of a display apparatus in response to a request input through the input unit.

The input unit may be an electrical switch. The electrical switch may be assigned to a key switch on a keyboard which is used for common input operations, or may be provided in addition to common input key switches. In the latter case, it may be provided as a dedicated switch on the keyboard, or on the display apparatus or the housing of the computer main unit. Alternatively, the electrical switch may be provided on a pointing device such as a pen tablet.

In a system having a graphical user interface (GUI), a button may be displayed on the display screen of the display apparatus as input unit and a mouse click on this button may be accepted as an input.

Alternatively, a voice-input device such as a microphone may be combined with a speech recognition program to accept the user's voice command as an input.

The present invention can provide a display control apparatus characterized by the following configuration: it comprises an input unit for accepting a predetermined input and a display-zoom-in unit for zooming in on a display by lowering the resolution of the display apparatus in response to a request for a display zoom-in accepted by the input unit.

The input unit is characterized by presenting display zoom factors provided according to the resolution of the display apparatus controlled by the display-zoom-in unit to a user and accepting a request for a zoom-in by a selected display zoom factor.

This characteristic is preferable as an operation environment for a user who wants to zoom in on a display because, instead of resolutions, zoom factors provided by changing the resolutions are presented to the user.

The display control system may be characterized by, in addition to the above-described configuration, further comprising display status restoring unit for holding a display status before the zoom-in by the display-zoom-in unit and, when the display-zoom-in is completed, restores the held display status.

The display control apparatus may be characterized by further comprising window resizing unit for resizing a predetermined window displayed on the display screen of the display apparatus so as to match the display screen zoomed in by the display-zoom-in unit.

The present invention can further provide a display control apparatus characterized by the following configuration: it comprises input unit for accepting a predetermined input and display control unit for changing a display zoom factor by changing the resolution of a display apparatus in response to a display zoom factor change request accepted by the input unit, and causing a predetermined window displayed on the display screen of the display apparatus to be displayed over the entire display screen after the resolution is changed.

This input unit may be an electrical hardware switch.

The present invention can further provide a display apparatus having an input section for inputting display image data and a predetermined command and a display screen for displaying a display image based on input data, wherein: the input section is used for inputting a request for changing a display zoom factor on the display screen as a command input; and the display screen displays the display image by using a zoom factor responsive to the request for changing the display zoom factor by changing the resolution.

The present invention is characterized by a display control method for controlling the display screen of a display apparatus, the method comprising the steps of: accepting a request for changing a display zoom factor on the display screen and changing the resolution of the display apparatus to change the display zoom factor of the display screen to a display zoom factor responsive to the request for changing display zoom factor.

The display control method may further comprise the steps of: before the step of changing the display zoom factor, storing a display status before the display zoom factor is changed; and restoring the stored display status when the display zoom factor is restored after the change of the display zoom factor.

The display control method may further comprise the step of: after the step of changing the display zoom factor, resizing a predetermined window displayed on the display screen so as to match the display screen after the display zoom factor is changed.

The present invention may be created as a program for causing a computer to perform processes corresponding to the steps in the above-described display control method and the program may be provided as a storage medium storing the program in a form readable by the input unit of the computer.

The present invention may be provided as a program transmission apparatus comprising storage unit for storing the program and transmission unit for reading the program from the storage unit to transmit said program.

The program may be configured so as to calculate a tensor field defined based on an element of a predetermined mesh as a process for extracting a characteristic of the mesh.

DETAILED DESCRIPTION OF THE PREFERRED EMBODIMENT

The present invention will be described below with respect to embodiments shown in the accompanying drawings.

An overview of the present invention will be provided first. The present invention changes a display zoom factor on a display screen by changing the resolution of a display apparatus. For example, when the resolution of a display screen having a physically fixed size is lowered, a portion of the display screen before the resolution change is displayed in entire area of the display screen after the resolution change. This enlarges a display image on the display screen. Thus, the present invention allows a display zoom factor on the display screen to be changed by using hardware unit without processing any video signal for the display image.

Figure 3:
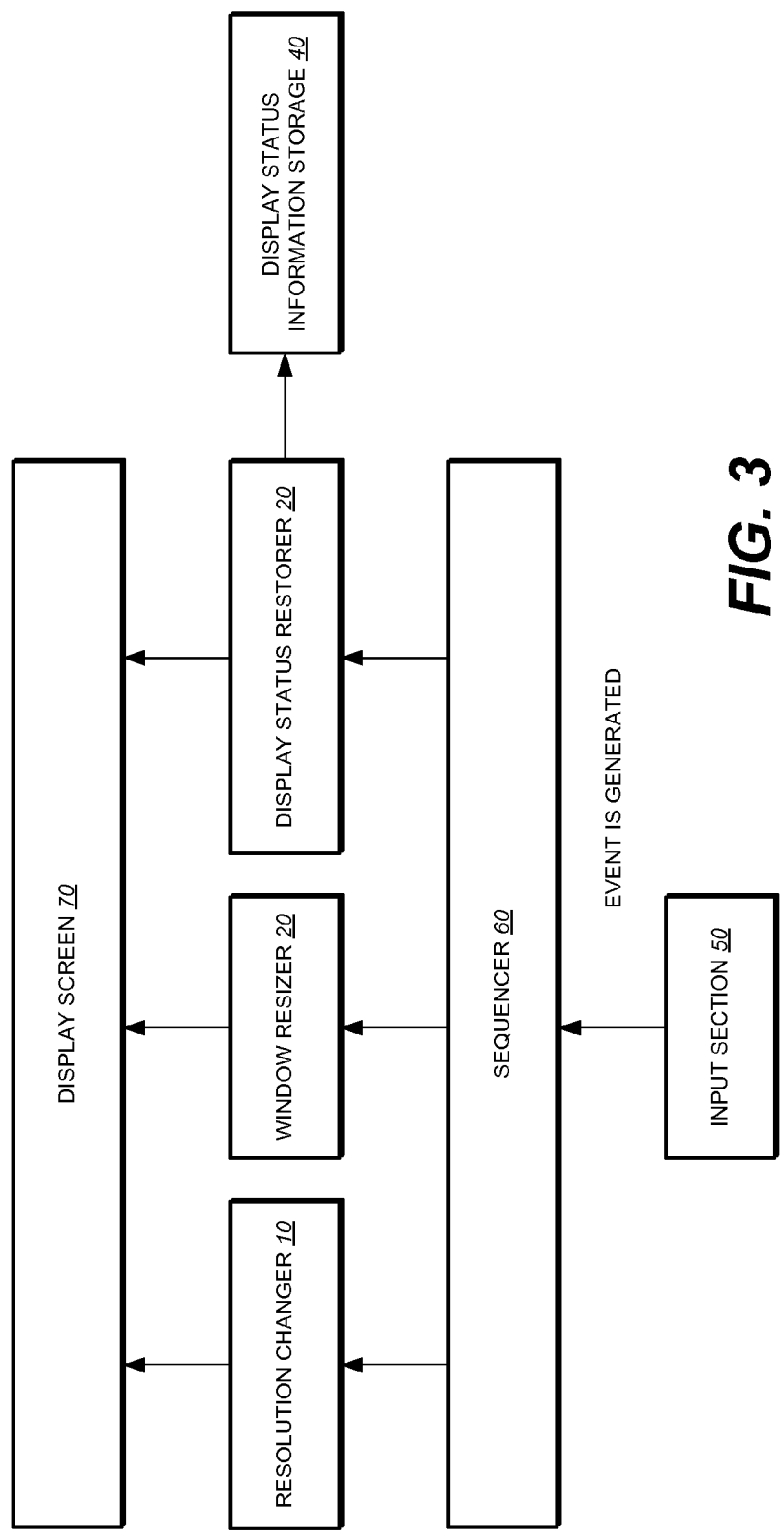
FIG. 3 is a diagram for explaining a configuration of a display zoom factor change apparatus according to an embodiment of the present invention.

FIG. 3 is a diagram for explaining a configuration of a display zoom factor changing apparatus according to an embodiment of the present invention. In FIG. 3, reference number 10 indicates a resolution changer for changing a display zoom factor on the display screen by changing the resolution of the display apparatus. Reference number 20 indicates a window resizer for resizing an window, which is a display area, according to a changed display zoom factor when the display zoom factor is changed by the resolution changer 10. Reference number 30 indicates a display status restorer for holding the display screen status before changing the display zoom factor and restoring the display screen to its original status when the resolution of the display apparatus is restored. Reference number 40 indicates a display status information storage for storing information for identifying the status of the display screen before the display zoom factor was changed, under the control of the display status restorer 30.

Reference number 50 indicates an input section, in which an event for changing a display zoom factor on the display screen is generated. Reference number 60 indicates a sequencer for activating the resolution changer 10, window resizer 20, or display status restorer 30 depending on a generated event. Reference number 70 indicates the display screen of the display apparatus.

In the configuration described above, the resolution changer 10 is implemented by using hardware unit that controls the resolution of the display apparatus. A typical display apparatus has a controller that allows a display image to be displayed in a plurality of resolutions to support various operation modes in a computer. This controller can be used as the resolution changer 10.

As the resolution of the display apparatus is changed, the display zoom factor of the display screen 70 is also changed. For example, a screen displayed in 1024 (dots)·768 (dots) resolution is changed to a screen in 640 (dots)·480 (dots) resolution, the display content (an image, character, and other content) is enlarged by a factor of 2.56 (=(1024·768)/(640·480)). The present embodiment will be described with respect to a case in which a display state in the highest resolution that can be achieved with the ability of the display apparatus and a graphics accelerator installed in the computer is assumed to be the standard and the display zoom factor of the display screen 70 is increased by lowering the resolution of the display apparatus by unit of the resolution changer 10. However, the present embodiment may of course be applied to an application in which a lower resolution is the standard and the display zoom factor is lowered by increasing the resolution in order to increase the amount of information provided on the display screen 70.

The window resizer 20 is implemented by components such as a CPU, a video chip, main memory, and video memory as well as software unit controlling these components.

When the resolution of the display apparatus is changed, the display zoom factor of the display screen 70 also changes, as described earlier. When the display zoom factor is increased by lowering the resolution, a window which is a working area may extend off the display screen 70. Therefore it is required that the display size of the window be changed correspondingly to the changed resolution. In addition, the position of the window is changed according to the changed resolution, as required.

In particular, the display size of the window can be changed by specifying coordinates on the display screen 70 with a changed resolution at which the window is positioned. Positioning of the window may also be performed by specifying its coordinates.

In an exemplary embodiment, the window may be displayed on almost the entire display screen 70 the resolution of which has been changed. Because the amount of information provided on the display screen 70 decreases when a display image is enlarged by lowering its resolution, it is preferable that at least the window which is the focus of operation is enlarged to maximize the amount of information provided.

An operating system including a multi-window system, which is widely used in today_s typical computer systems, allows an active window, which is ready for operation, to be selected to change its display size and position. In such a case, the size and position of an inactive window may or may not be changed together with those of the active window.

In view of the purpose of enlarging to improve the visibility of what is to be operated, it may suffice that only the active window is resized and repositioned. On the other hand, if operations are performed by switching one window to another among a plurality of windows, the display sizes and positions of all the windows displayed on the display screen 70 are preferably adjusted to the resolution-changed display screen 70.

If Windows 98 or Windows NT from Microsoft Inc., for example, is used as the operating system of the computer system, a maximization capability for displaying a predetermined window on the entire display screen 70 is available in the operating system. The display size of a window can be adjusted to the display screen with a changed resolution by using this maximization capability.

Maximizing a window would impair advantages provided by a multi-window system supported by an operating system such as Windows 98. However, because user operations are performed essentially on a single window (active window) and a demand for a zoom on the display screen 70 to improve visibility may occur mainly for the specific window on which operations are being performed, maximizing that window may not impair convenience to the user. Under an operating system such as Windows 98, even if a given window is maximized, another window can easily be activated by clicking on an appropriate button on a task bar with a mouse. Therefore, working efficiency is not decreased even if the user opens a plurality of windows and performs operations by switching between a window and another.

The window resizer 20 is not required in a system which does not employ a window-based display system. The present embodiment, however, has a configuration including the window resizer 20 because most of today_s typical computer systems employ a window-based display system.

The display restorer 30 is implemented by components such as a CPU, video chip, main memory, and video memory as well as software unit controlling them.

As the resolution of the display apparatus is changed, a window is resized by the window resizer 20. Therefore the window should be restored to its original status when the original resolution is restored. In addition, even if no window is displayed on the display screen, a display object such as an icon could have been repositioned as the resolution was changed. In such a case, the icon should be restored to its original position. Furthermore, display status should be restored when the resolution is restored even in a computer system which does not use a window-based system, in consideration of display changes caused by the resolution change.

Therefore, before the resolution of the display apparatus is changed by the resolution changer 10, the display status restorer 30 obtains information about the display status of display screen 70 in the unchanged resolution and stores the information in the display status information storage 40. When a process for restoring the resolution of the display apparatus is performed subsequently, the display status restorer 30 reads the information about the display status in the unchanged resolution from the display status information storage 40 to restore the display screen 70 to its original status.

The display status storage 40 may be main memory such as RAM or other storage, including an external storage device such as a magnetic disk drive device.

The input section 50 accepts a user operation and generates an event (hereinafter called "display zoom factor change event") that causes a zoom and restoration of a display by a change in the resolution of the display apparatus.

A hardware key switch (a electrical switch), for example, may be provided as the unit for accepting the user operation. The key switch may be provided as a special key on a keyboard, which is input unit of the computer system, in addition to keys commonly used for input operations, or any of the keys commonly used for input operations. Alternatively, the key switch may be provided on the display apparatus, the housing of the computer main unit, or a pointing device such as a pen tablet.

In a computer system including a Graphical User Interface (GUI), a button may be displayed on the display screen 70 of its display apparatus for accepting the user's click operation on the button to generate a display zoom factor change event.

Alternatively, a voice-input device such as a microphone may be provided in the computer system and combined with a speech recognition program to accept the user's voice command to generate a display zoom factor change event. For example, the user can vocally provide a command, "Zoom-in", and the voice input can change the display zoom factor. Of course, the voice command for generating the display zoom factor change event can be defined by the user at will.

When a display zoom factor change event is generated by an operation from the input section 50, an activation instruction is provided to the resolution changer 10, window resizer 20, and display status restorer 30 through the sequencer 60. For example, if Windows 98 from Microsoft Inc. is used as the OS of the computer system and the maximization function provided by Window 98 is used to resize a window together with the window resizer 20, the following API as shown below is issued as the activation instruction when enlarging the display. That is, in order to change the resolution of the display apparatus, the following API is issued to the resolution changer 10.

ChangeDisplaySettings(LPDEVMODE lpDevMode,
DWORD dwflags);
ChangeDisplaySettingsEx (LPCTSTR lpszDeviceName,
LPDEVMODE lpDevMode,
HWND hwnd,
DWORD dwflags,
LPVOID lParam):

And, in order to maximize the window, the following API is issued to the window resizer 20.

ShowWindowAsync (HWND hwnd, int showcmd):

MoveWindow (HWND hwnd,
int x, int y, int nWidth, int nHeight,
BOOL bRepaint):

The input section presents magnifications (display zoom factors) of the display to the user to allow the user to select a desired display zoom factor from them. The factors that can be presented depend on display resolutions that can be set in the display apparatus. If 1024 (dots)·768 (dots) resolution, for example, is the standard resolution, the display size of an image or character would be increased by a factor of 2.56 by changing the resolution to 640 (dots)·480 (dots) as described earlier. Similarly, if the resolution is changed to 800 (dots)·600 (dots), the display size of an image or character increases by a factor of 1.6384. Thus, in a system that can display images and characters in these three resolutions, zoom factors of 2.56 and 1.6384 can be presented with respect to the standard zoom factor (1·) to allow the user to select a desired factor from them.

Because the user wants to zoom-in on a display on the display screen, It is preferable that selectable zoom factors, rather than resolutions, are presented here. The zoom factors may be presented as a pop-up menu on the display, or hardware key switches may be provided on the keyboard or other components to allow the user to select one. In a system such as a notebook computer for which available models of display apparatuses are fixed to some extent, a separate switch may be provided for each zoom factor. In real zoom factor presentation, rounded zoom factors such as 2.5 and 1.6 may be displayed, rather than presenting precise values such as 2.56 and 1.6384 as mentioned above.

In the zoom factor change apparatus configured as described above, the resolution changer 10, window resizer 20, display status restorer 30, display status information storage 40, input section 50, and sequencer 60 can be installed in various hardware units in a computer system. A basic configuration may be as follows: the resolution changer 10, window resizer 20, display status restorer 30, and display status information storage 40 are provided in the main unit of the computer, the input section 50 is provided on the keyboard to accept inputs, and only instruction signals from the resolution changer 10, window resizer 20, and display status restorer 30 are transmitted to the display apparatus. Some of these components, including the resolution changer 10, display status restorer 30, and display status information storage 40, may be provided in the display apparatus. Alternatively, all of these components may be provided in the display apparatus. The input section 50 may be provided in various hardware units as mentioned above.

The operation of the present embodiment will be described below.

Figure 4:
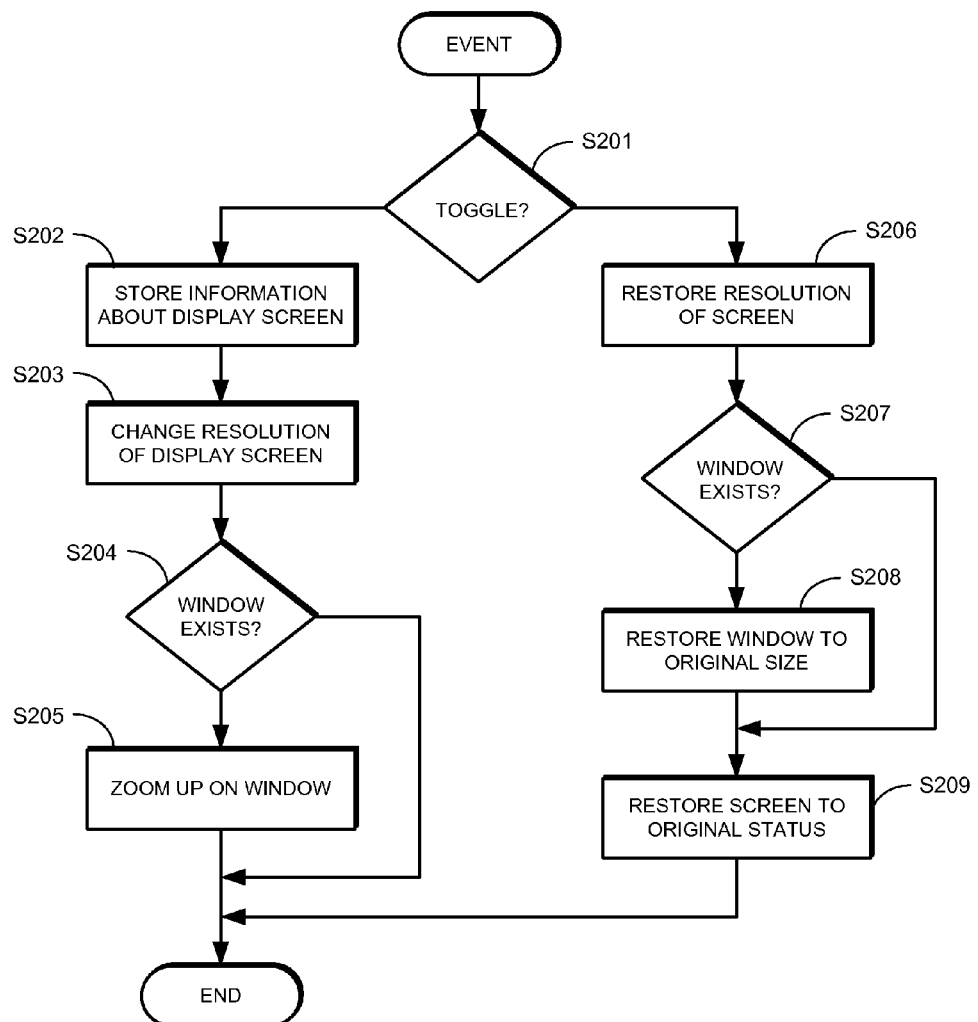
FIG. 4 shows a flowchart describing an operation of the embodiment.

FIG. 4 is a flowchart for explaining the operation of the present embodiment. In FIG. 4, when an event for changing the zoom factor of the display screen is generated by an operation through the input section 50, the display status restorer 30 first obtains information about the display status of the display screen and stores it in the display status information storage 40 if the event is a request for zoom-in of a display (steps 201, 202).

Then the resolution changer 10 changes the resolution of the display apparatus to a resolution that matches the zoom factor requested by the zoom-in request (step 203). Then the window resizer 20 determines whether a window is displayed on the display screen, and if one is displayed, resizes the window so as to match the changed resolution of the display screen (steps 204, 205). Here, only an active window may be detected and resized as described earlier. In addition, the window may be displayed on the entire display screen after the resolution change.

If no window is displayed on the display screen, the window resizer 20 terminates processing without performing any process (step 204).

If the event generated by the operation from the input section 50 is a request to restore the zoom factor to its original value (to a standard zoom factor), the resolution changer 10 first restores the resolution of the display apparatus to a resolution that is set as the standard (steps 201, 206).

Then the display status restorer 30 reads information about the display status of the display screen before its resolution was changed from the display status information storage 40 to restore the display screen to its original status. In particular, if a window exists on the display screen, the window is restored to its size before the resolution was changed (steps 207, 208). If no window exists on the display screen, or the display size of the window is restored at step 208, the display status of an object such as an icon is restored to its original status (step 209).

Figure 1:
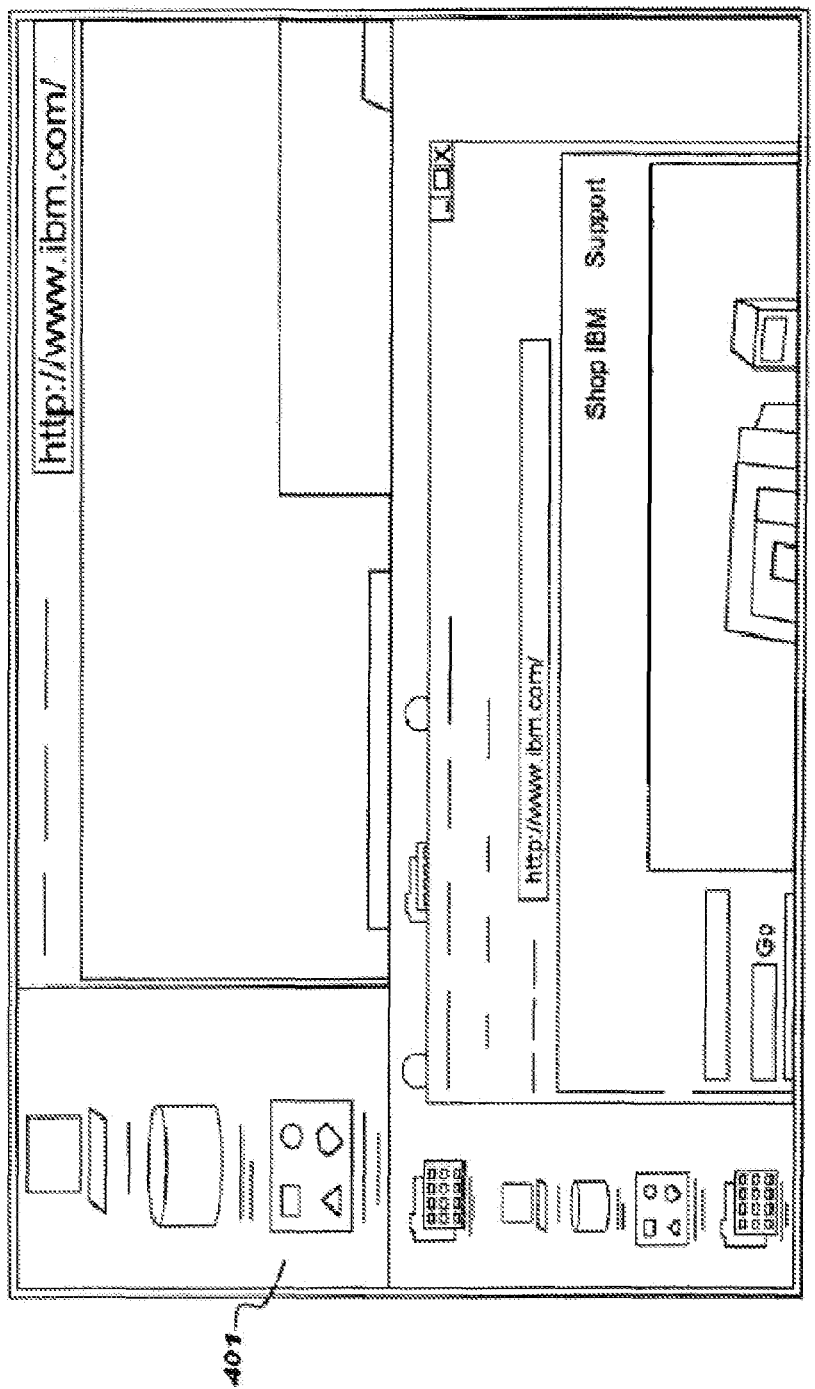
FIG. 1 shows a conventional display on a display screen zoomed in according to prior art.
Figure 2:
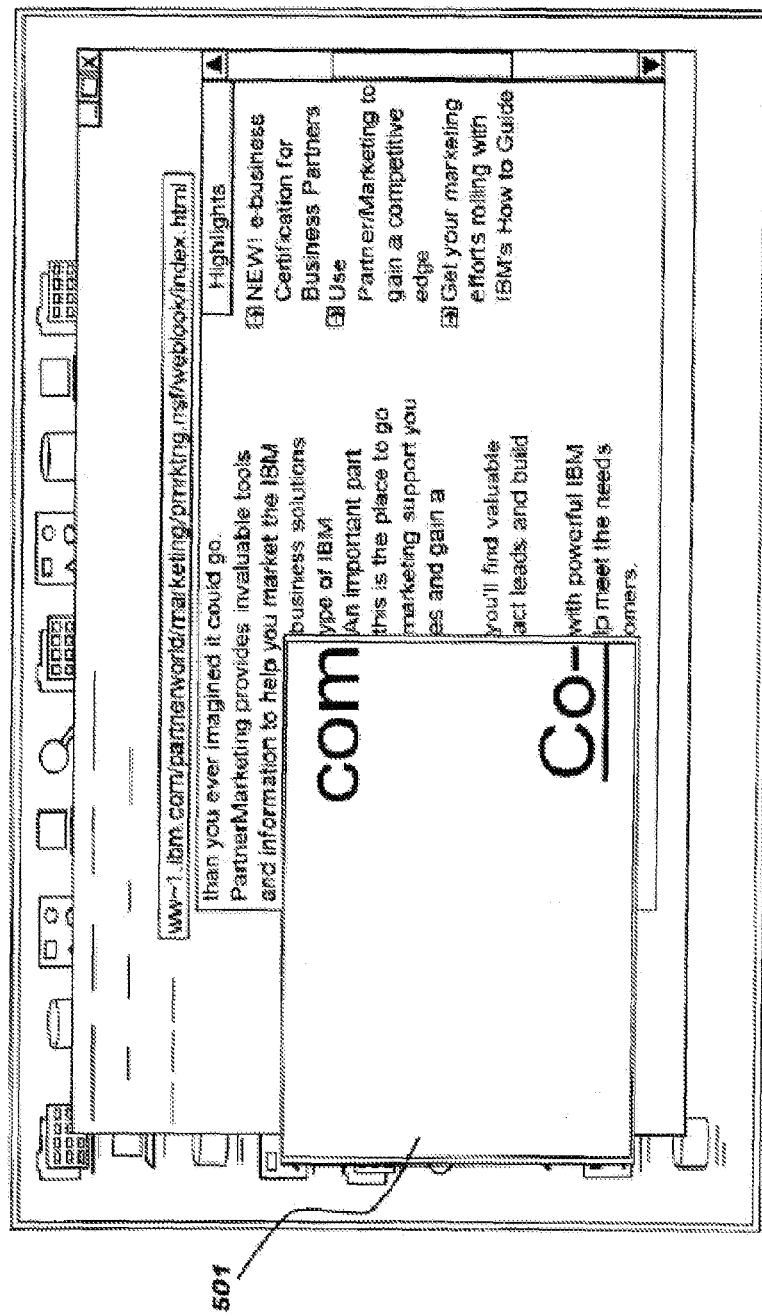
FIG. 2 shows a conventional display on a display screen zoomed in according to another prior art.
Figure 5A:
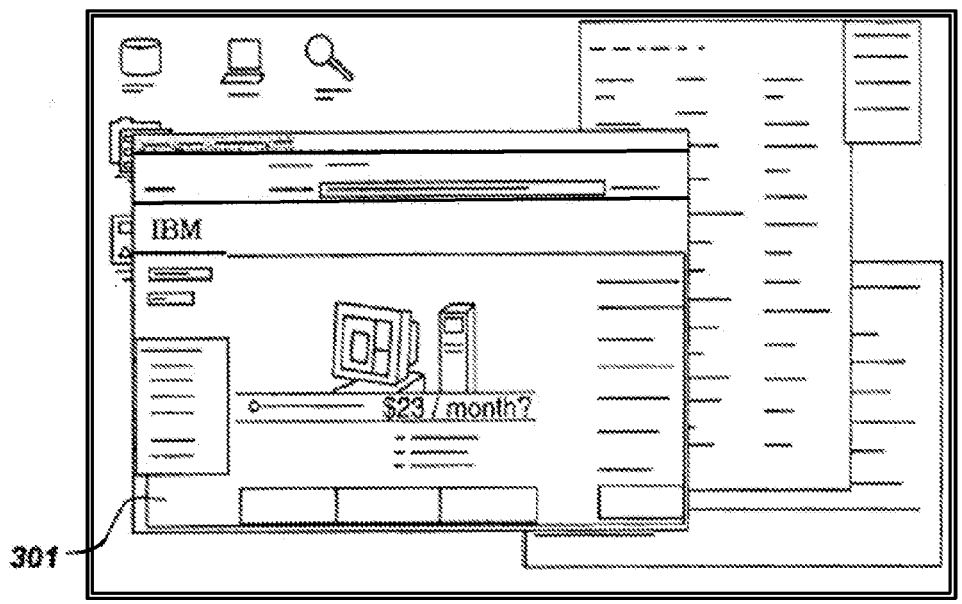
FIGS. 5A and 5B show an example in which a display image is zoomed in according to the embodiment.
Figure 5B:
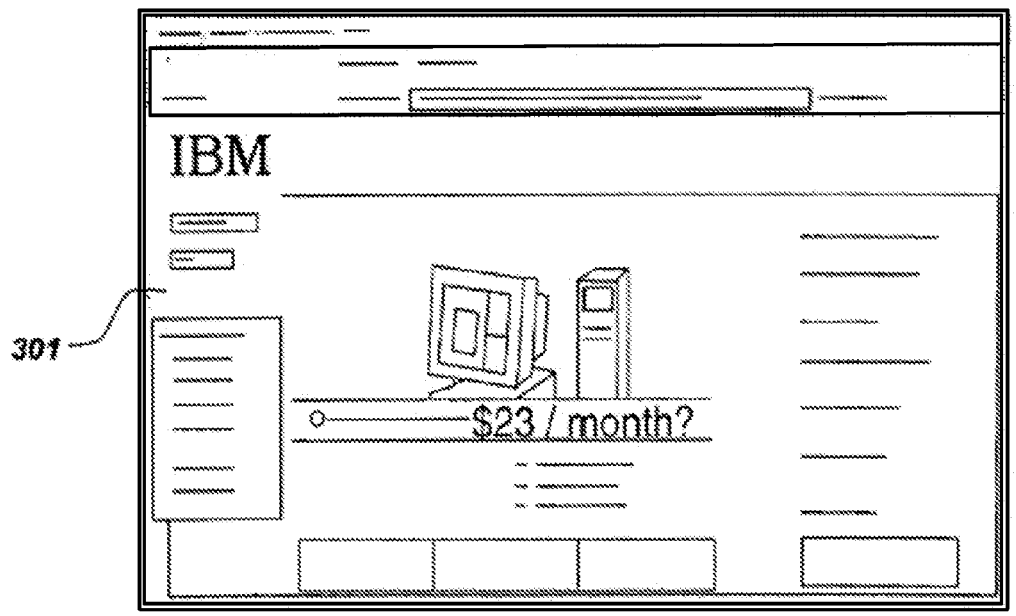

FIGS. 5A and 5B show an example in which a display image is zoomed in accordance to the present embodiment. In the example in FIG. 1, it is assumed that an active window is maximized as the display image is zoomed.

When a zoom-in request is made by operating the input section 50 in the present embodiment, the display screen changes from a standard zoom factor status shown in FIG. 5A to a zoomed-in status shown in FIG. 5B. Comparing the display screen of FIG. 5A with display screen of FIG. 5B, it can be seen that an active window 301 in FIG. 5A is maximized in FIG. 5B so as to extend over the entire display screen and the content of the active window 301 is enlarged.

The invention claimed is:

1. A computer system having a central processing unit (CPU), and a display apparatus coupled to the CPU, the computer system comprising:

an input section operable to present a zoom factor to a user, the zoom factor specifying a pre-determined magnification amount for zooming in on an image displayed on a display screen of the display apparatus and being a number equal to a first resolution of the display apparatus divided by a second resolution of the display apparatus, the input section further operable to receive user input selecting the zoom factor;

a resolution changing unit operable to zoom in on the image displayed on the display screen in accordance with the pre-determined magnification amount by changing a resolution of the display apparatus from the first resolution to the second resolution in response to the user input selecting the zoom factor, wherein the image is displayed within an active window and the resolution changing unit is operable to zoom in on the image displayed on the display screen by resizing the active window, and wherein a size of an inactive window being displayed on the display screen remains unchanged irrespective of the resolution change of the display apparatus from the first resolution to the second resolution; and a display status restoring unit operable to hold a first display status of the image displayed on the display screen before the resolution of the display apparatus is changed to the second resolution by the resolution changing unit, the display status restoring unit further operable to restore the image displayed on the display screen to the first display status when the resolution of the display apparatus is restored to the first resolution.

2. The computer system according to claim 1, further comprising an electrical switch operable to accept the user input selecting the zoom factor.

3. The computer system according to claim 2, wherein the electrical switch is provided as a key on a keyboard that is coupled to the computer system.

4. The computer system according to claim 1, wherein the user input selecting the zoom factor is received through the user clicking on a button within a graphical user interface displayed on the display screen of the display apparatus.

5. The computer system according to claim 1, wherein the user input selecting the zoom factor is received through a voice input device.

6. A display apparatus comprising:

an input section operable to present a zoom factor to a user, the zoom factor specifying a magnification amount for zooming in on an image displayed on a display screen of the display apparatus and being a number equal to a first resolution of the display apparatus divided by a second resolution of the display apparatus, the input section further operable to receive user input selecting the zoom factor;

a resolution changing unit operable to zoom in on the image displayed on the display screen in accordance with the magnification amount by changing a resolution of the display apparatus from the first resolution to the second resolution that is lower than the first resolution in response to the user input selecting the zoom factor, wherein the image is displayed within an active window and the resolution changing, unit is operable to zoom in on the image displayed on the display screen by resizing the active window, and wherein a size of an inactive window being displayed on the display screen remains unchanged irrespective of the resolution change of the display apparatus from the first resolution to the second resolution; and a display status restoring unit operable to hold a first display status of the image displayed on the display screen before the resolution of the display apparatus is changed to the second resolution by the resolution changing unit, the display status restoring unit further operable to restore the image displayed on the display screen to the first display status when the resolution of the display apparatus is restored to the first resolution.

7. The display apparatus according to claim 6, further comprising an electrical switch operable to accept the user input selecting the zoom factor.

8. The display apparatus according to claim 6, wherein user input selecting the zoom factor is received through the user clicking on a button within a graphical user interface displayed on the display screen of the display apparatus.

9. A method for performing a zoom operation on an image displayed on a display screen of a display apparatus, the method comprising:

presenting a zoom factor to a user, the zoom factor specifying a magnification amount for zooming in on the image displayed on the display screen of the display apparatus and being a number equal to a first resolution of the display apparatus divided by a second resolution of the display apparatus;

receiving user input selecting the zoom factor displayed on a display screen of the display apparatus;

zooming in on the image displayed on the display screen in accordance with the pre-determined magnification amount by changing a resolution of the display apparatus from the first resolution to the second resolution in response to the user input selecting the zoom factor, wherein the image is displayed within an active window of the display screen and zooming in on the image includes resizing the active window and not resizing an inactive window responsive to the resolution change of the display apparatus from the first resolution to the second resolution;

holding a first display status of the image displayed on the display screen before the resolution of the display apparatus is changed to the second resolution; and restoring the image displayed on the display screen to the first display status when the resolution of the display apparatus is restored to the first resolution.

* * * * *